United States Patent [19]

Lencoski

[11] Patent Number: 5,568,867
[45] Date of Patent: Oct. 29, 1996

[54] PAPER CUSHIONING PRODUCT

[75] Inventor: Michael J. Lencoski, Claridon Township, Ohio

[73] Assignee: Ranpak Corp., Concord Township, Ohio

[21] Appl. No.: 341,480

[22] Filed: Nov. 17, 1994

Related U.S. Application Data

[63] Continuation of Ser. No. 956,116, Oct. 5, 1992, abandoned.

[51] Int. Cl.[6] .................................................. B65D 81/02
[52] U.S. Cl. ........................................... 206/584; 206/521
[58] Field of Search .................................... 206/584, 423, 206/521; 493/405, 154, 167, 941, 951, 967; 428/34.1, 34.2, 34.3; 47/74, 41.01

[56] References Cited

U.S. PATENT DOCUMENTS

| | | | |
|---|---|---|---|
| 1,069,675 | 8/1913 | Claussen | 493/154 X |
| 1,417,916 | 5/1922 | House | 428/34.2 X |
| 1,811,574 | 6/1931 | Barrett | 206/423 |
| 1,915,164 | 6/1933 | Orem et al. | 493/154 |
| 1,979,771 | 11/1934 | Potter | 47/41.01 |
| 2,002,582 | 5/1935 | Potter | 47/41.01 X |
| 2,330,705 | 9/1943 | Hamblet | 47/41.01 X |
| 2,579,036 | 12/1951 | Edelman . | |
| 2,592,692 | 4/1952 | Hattenback | 428/34.1 X |
| 2,649,959 | 8/1953 | Hallaman . | |
| 2,741,958 | 4/1956 | Bridge, Sr. . | |
| 3,000,526 | 9/1961 | Ford | 493/154 X |
| 3,047,136 | 7/1962 | Graham . | |
| 3,074,543 | 1/1963 | Stanley . | |
| 3,177,108 | 4/1965 | Waszkiewicz, Jr. | 47/41.01 X |
| 3,304,219 | 2/1967 | Nickerson . | |
| 3,481,455 | 12/1969 | Graham et al. . | |
| 3,546,055 | 12/1970 | Spertus . | |
| 3,575,781 | 4/1971 | Prezely . | |
| 3,650,877 | 3/1972 | Johnson | 493/967 X |
| 3,655,500 | 4/1972 | Johnson . | |
| 4,042,658 | 8/1977 | Collins . | |
| 4,950,216 | 8/1990 | Weder | 493/162 |
| 5,129,182 | 7/1992 | Weder | 206/423 X |
| 5,134,013 | 7/1992 | Parker | 493/967 X |
| 5,151,312 | 9/1992 | Boeri | 206/584 |

FOREIGN PATENT DOCUMENTS

| | | | |
|---|---|---|---|
| 0457162 | 11/1991 | European Pat. Off. | 206/584 |
| 8622069 | 2/1986 | Germany . | |
| 4124179 | 2/1992 | Germany | 206/584 |
| 0266924 | 10/1990 | Japan | 493/154 |

*Primary Examiner*—Ted Kavanaugh
*Attorney, Agent, or Firm*—Renner, Otto Boisselle & Sklar

[57] ABSTRACT

A thimble-shaped cushioning product is provided which includes a relatively flat top wall and a tubular wall extending therefrom. In the preferred embodiment, the top wall is circular and approximately ½ inch to 1 inch in diameter. Additionally, the tubular wall is approximately ½ inch to 1 inch in length and has a distal edge which follows a jagged path. The cushioning product is preferably made of paper or, more preferably, thirty-pound kraft paper and die-formed from a polygonal or, more preferably, a substantially square, piece of a sheet-like material.

17 Claims, 1 Drawing Sheet

U.S. Patent  Oct. 29, 1996  5,568,867
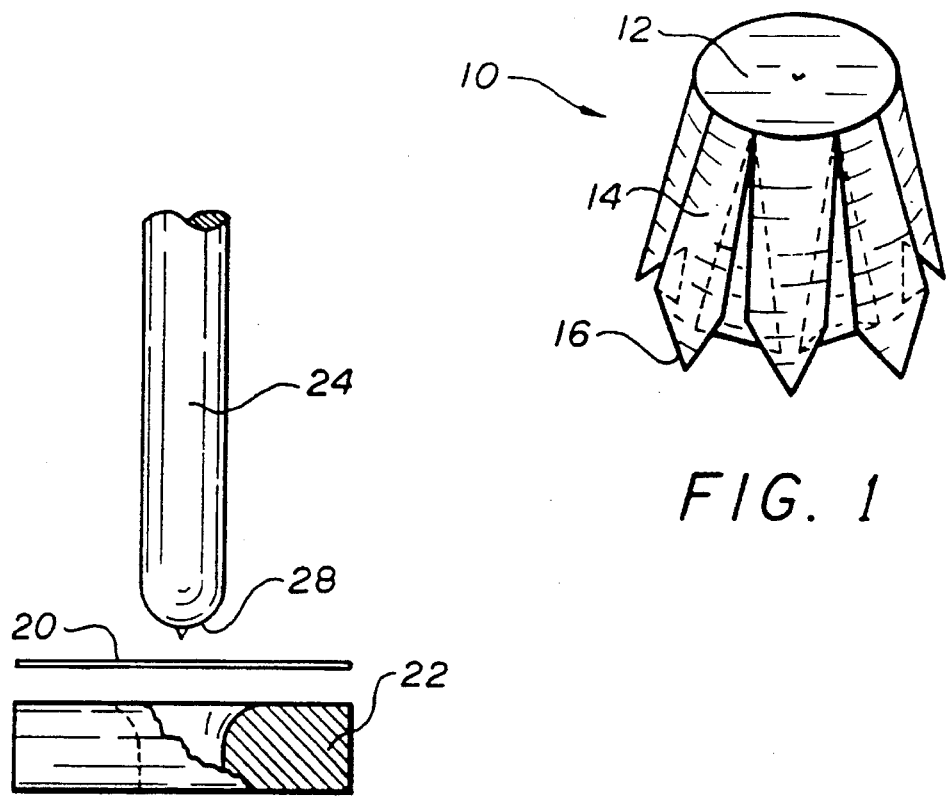
FIG. 1
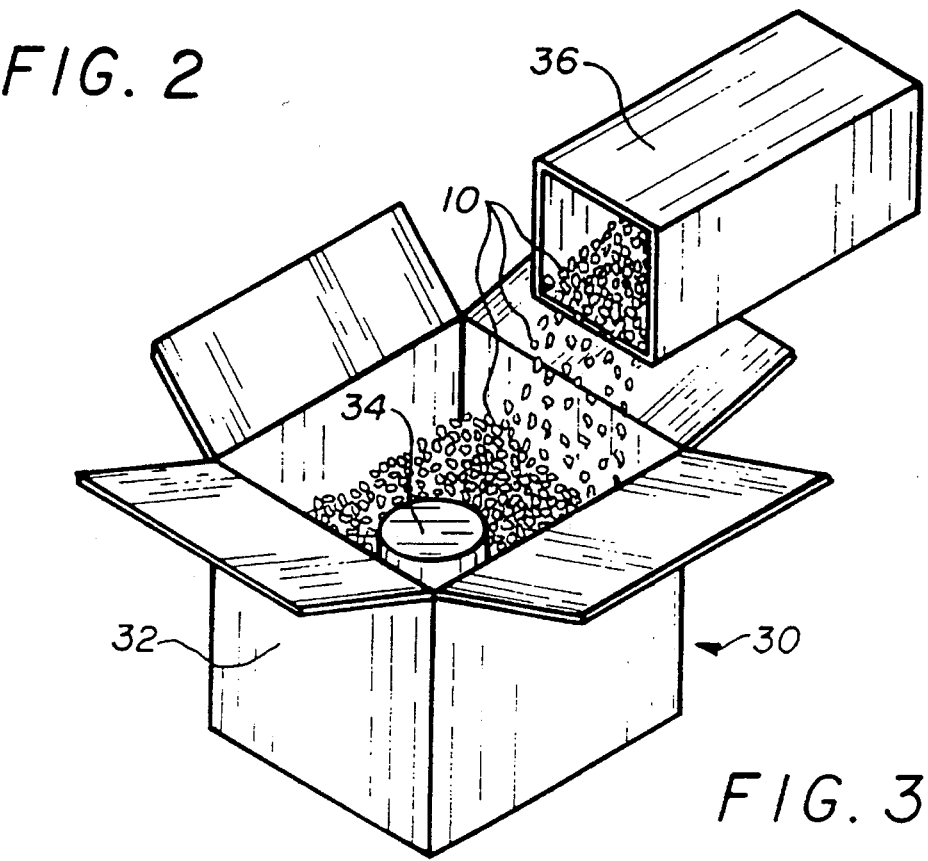
FIG. 2
FIG. 3

5,568,867

PAPER CUSHIONING PRODUCT

This is a continuation of application Ser. No. 07/956,116 filed on Oct. 5, 1992 now abandoned.

FIELD OF THE INVENTION

This invention relates generally as indicated to a paper cushioning product and more particularly to a paper cushioning product which has the same flowability features as conventional styrofoam peanuts and which may be produced by a relatively simple die-forming process.

BACKGROUND OF THE INVENTION

In the process of shipping an article from one location to another, the article is typically placed in a container along with a protective packaging material to fill any voids and/or to cushion the article during the shipping process. One common protective packaging material is comprised of a plurality of plastic foam, peanut-shaped, products which are commonly known as "styrofoam peanuts." These styrofoam peanuts are of such a "flowability" or "pourability" that they may be easily poured from a dispenser into a container and substantially surround an article positioned within the container.

While styrofoam peanuts have been widely accepted in the packaging industry, they are not without disadvantages, the most serious of which is their effect on our environment. Quite simply, styrofoam peanuts are not biodegradable and thus they cannot avoid further multiplying our planet's already critical waste disposal problems. The non-biodegradability of these packaging materials has become increasingly important in light of many industries adopting more progressive policies in terms of environmental responsibility, This and other disadvantages of styrofoam peanuts has made paper protective packaging material a very popular alterative. Paper is biodegradable, recyclable and renewable; making it an environmentally responsible choice for conscientious companies. In the past, attempts have been made to develop paper cushioning products which have the same flowability features as styrofoam peanuts. For example, U.S. Pat. No. 4,997,091 to McCrea discloses pellet-shaped cushioning products which are produced by extruding paper pulp and which probably have the same flowability features as styrofoam peanuts. However, the McCrea process appears to include complicated pulping and extruding steps which would not be necessary in, for instance, a simple die-forming process performed on kraft paper.

Applicants therefore believe that a need remains for a paper cushioning product which has the same flowability features as conventional styrofoam peanuts and which may be made from a relatively simple die-forming process.

SUMMARY OF THE INVENTION

The present invention provides a paper cushioning product which has the same flowability features as conventional styrofoam peanuts and which may be made from a relatively simple process. Thus, the cushioning products of the present invention are of such a "flowability" or "pourability" that they may be easily poured from a dispenser while at the same time being biodegradable and recyclable. Additionally, complicated pulping and extruding steps are not necessary to create these environmentally responsible cushioning products.

More particularly, the present invention provides a cushioning product comprising a relatively flat top wall and a tubular wall extending therefrom. In the preferred embodiment, the top wall is circular and approximately ½ inch to 1 inch in diameter. Additionally, the tubular wall is approximately ½ inch to 1 inch in length and has a distal edge which follows a jagged path. The cushioning product is preferably made of paper or, more preferably, thirty-pound kraft paper. Additionally, the product has a geometry consistent with it being formed from a polygonal or, more preferably, a substantially square, piece of a sheet-like material.

The present invention also provides a method making a cushioning product which generally includes the steps of providing a piece of a sheet-like material; and forming the piece into a thimble shape. More particularly, the method includes the steps of providing a die and a complimentary punch; positioning the piece of paper over the die; and driving the punch through the die to form the piece of sheet-like material into the desired shape of the cushioning product. The piece of the sheet-like material preferably comprises a polygonal piece of the paper. More preferably, the piece comprises a substantially square piece of thirty-pound kraft which is approximately 1½ to 2 inches in length/width.

A plurality of the cushioning products may be incorporated into a package which additionally includes a container and an article positioned within the container. The cushioning products may be easily poured from a dispenser into the container and will substantially surround the article positioned within the container. In this manner, the cushioning products will function as a protective packaging material which fills any voids and/or which cushions the article during a shipping process.

These and other features of the invention are fully described and particularly pointed out in the claims. The following descriptive annexed drawings set forth in detail one illustrative embodiment. However this embodiment is indicative of but one of the various ways in which the principles of the invention may be employed.

BRIEF DESCRIPTION OF THE DRAWINGS

In the annexed drawings:

FIG. 1 is a perspective view of a cushioning product according to the present invention;

FIG. 2 is a schematic illustration of a method of making a cushioning product according to the present invention; and FIG. 3 is a perspective view of a package incorporating a cushioning product according to the present invention.

DETAILED DESCRIPTION

Referring now to the drawings in detail, and initially to FIG. 1, a cushioning product according to the present invention is shown generally at 10. As is explained in more detail below the product 10 has the same flowability features as conventional styrofoam peanuts and may be made from a relatively simple die-forming process.

The cushioning product 10 is generally thimble-shaped. "Thimble-shaped" in this context corresponds to a generally cup-shaped geometry which is roughly sized to be inserted over a person's finger tip. To this end, the cushioning product 10 comprises a relatively flat top wall 12 and a tubular wall 14 extending therefrom. In the preferred embodiment, the top wall 12 is circular and approximately ½ inch to 1 inch in diameter. Additionally, the tubular wall is approximately ½ inch to 1 inch in length and has a distal edge 16 which follows a jagged path.

Referring now additionally to FIG. 2, a method of making a cushioning product according to the present invention is schematically shown. This method generally includes the steps of providing a piece 20 of a sheet-like material; and forming the piece 20 into a thimble shape. More particularly, the method includes the steps of providing the piece 20 of the sheet-like material; providing a die 22 and a complimentary punch 24; positioning the piece of paper 20 over the die 22; and driving the punch through the die 22 to form the piece of sheet-like material into the desired shape of the cushioning product 10. Thereafter, the punch 24 is retracted from the die 22 with the formed sheet-like material attached thereto; and the formed sheet-like material is stripped from the retracted punch for use as a cushioning product.

The piece 20 of the sheet-like material preferably comprises a polygonal piece of the paper. More preferably, the piece 20 comprises a substantially square piece of thirty-pound kraft which is approximately 1½ to 2 inches in length/width. The piece 20 is preferably formed by cutting one or more layers of the sheet-like material into a plurality of essentially identical pieces. If square pieces are used to form the cushioning product 10, little or no waste is created during this cutting process. In any event, the cushioning product 10 is preferably made of paper or, more preferably, thirty-pound kraft paper. Additionally, the product 10 has a geometry consistent with it being die-formed from a polygonal or, more preferably, a substantially square, piece of a sheet-like material.

The sheet-like material may be soaked or wet in a starch solution or another suitable stiffening solution prior to the cutting process. Alternatively, the plurality of pieces may be soaked or wet with such a solution prior to the forming process. In either case, this soaking would result in the product 10 having an increased "stiffness" which may be desirable for certain applications.

The die 22 is preferably a circular die having an approximately ½ inch to 1 inch diameter and the punch 24 is preferably a cylindrical punch with a rounded driving end 28. The die 22 preferably has a highly polished surface and the punch 24 preferably has a textured surface. In this manner, the piece 20 of sheet-like material will slip freely through the die 22 and it will not migrate up the punch 24 during the forming process. If the piece 20 is the preferred square piece of thirty-pound kraft paper, the distal edges of the formed piece will expand slightly once the piece is driven all the way through the die. In this manner, the formed piece may be easily stripped off the punch 24 when it is retracted. In the preferred embodiment, the punch is driven approximately ½ inch to 1 inch through the die.

Referring now additionally to FIG. 3, a plurality of the cushioning products 10 are shown incorporated into a package 30. The package 30 additionally includes a container 32 and an article 34 positioned within the container 32. The cushioning products 10 may be easily poured from a dispenser 36 into the container and will substantially surround the article 34 positioned within the container 32. In this manner, the cushioning products 10 will function as a protective packaging material which fills any voids and/or which cushions the article during a shipping process.

One may now appreciate that the present invention provides a paper cushioning product which has the same flowability features as conventional styrofoam peanuts and which may be made from a relatively simple die-forming process. Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A package comprising a container, an article positioned in the container, and a plurality of cushioning products positioned in the container and substantially surrounding the article, said cushioning products each being formed from a piece of sheet-like material and comprising a tubular wall and an end wall closing one end of said tubular wall, said tubular wall having portions folded over on themselves and having at its other end opposite said one end a circumferential edge which is jagged in an axial direction.

2. A package as set forth in claim 1 wherein said end wall is circular and has a diameter in the range of about ½ to 1 inch.

3. A package as set forth in claim 2, wherein said product is thimble-shaped.

4. A package as set forth in claim 2, wherein said tubular wall has a length in the range of about ½ to 1 inch.

5. A package as set forth in claim 4, wherein said piece of sheet-like material is made of kraft paper.

6. A package as set forth in claim 4, wherein said product is thimble-shaped.

7. A package as set forth in claim 4, wherein said piece of sheet-like material is made of paper.

8. A package as set forth in claim 4, wherein said end wall is flat.

9. A package as set forth in claim 1, wherein said piece of sheet-like material is made of kraft paper.

10. A package as set forth in claim 9, wherein said product is thimble-shaped.

11. A package as set forth in claim 9, wherein said end wall is circular and has a diameter in the range of about ½ to 1 inch.

12. A package as set forth in claim 1, wherein said product is thimble-shaped.

13. A package as set forth in claim 1, wherein said piece of sheet-like material is made of paper.

14. A package as set forth in claim 13, wherein said product is thimble-shaped.

15. A package as set forth in claim 13, wherein said end wall is circular and has a diameter in the range of about ½ to 1 inch.

16. A package as set forth in claim 1, wherein said end wall is flat.

17. A package as set forth in claim 16, wherein said end wall is circular and has a diameter in the range of about ½ to 1 inch.

* * * * *